United States Patent [19]

Utsunomiya et al.

[11] 4,143,454
[45] Mar. 13, 1979

[54] METHOD OF FIXING CONNECTION PARTS OF RUBBER OFFSHORE STRUCTURES

[75] Inventors: Tadashi Utsunomiya; Shigeo Ueda; Kiyotaka Kamachi; Masatoshi Wakamiya, all of Yokohama, Japan

[73] Assignee: Bridgestone Tire Company Limited, Tokyo, Japan

[21] Appl. No.: 801,967

[22] Filed: May 31, 1977

[30] Foreign Application Priority Data

Jun. 4, 1976 [JP] Japan .................................. 51-64568

[51] Int. Cl.² .............................................. B23P 3/00
[52] U.S. Cl. .................................. 29/460; 29/526 R; 52/515; 427/385 B
[58] Field of Search ................. 29/460, 526; 52/309.2, 52/515; 427/388 A, 385 B; 428/36; 85/1 C

[56] References Cited

U.S. PATENT DOCUMENTS

| | | |
|---|---|---|
| 2,114,289 | 4/1938 | Draim ................................... 52/515 |
| 2,820,723 | 1/1958 | Le Suer .............................. 427/388 X |
| 2,861,525 | 11/1958 | Curtis et al. ....................... 52/515 X |
| 3,293,203 | 12/1966 | Paulus .............................. 427/388 A |
| 3,542,718 | 11/1970 | Davis ............................ 427/388 A X |
| 3,560,246 | 2/1971 | Payne ........................... 427/388 A X |
| 3,869,305 | 3/1975 | Eland ............................. 427/388 AX |
| 3,925,582 | 12/1975 | Sample, Jr. et al. ............. 427/388 A |

OTHER PUBLICATIONS

"1001 Custom and Rod Ideas", Jan. 1976, pp. 23,25,61.

Primary Examiner—Leon Gilden
Attorney, Agent, or Firm—Sughrue, Rothwell, Mion, Zinn and Macpeak

[57] ABSTRACT

A method of fixing connection parts of rubber offshore structures is disclosed. The connection part of the rubber offshore structure is firmly fixed to a corresponding portion of a connecting part by means of a metal fixing member by covering the outer surface of the metal fixing member, after fastened, with a liquid rubber composition curable at room temperature.

19 Claims, 3 Drawing Figures

METHOD OF FIXING CONNECTION PARTS OF RUBBER OFFSHORE STRUCTURES

BACKGROUND OF THE INVENTION

1. Field of the Invention

The present invention relates to a method of fixing connection parts of rubber offshore structures such as marine fender, oil boom, marine hose, sleeve hose and the like.

2. Description of the Prior Art

In general, bolt and nut means are widely used as a method of fixing a marine fender constructed with a shock receiving portion, supporting portions and securing portions to a supporting surface of a quay wall or the like. In recent years, however, vessels are considerably large-sized and hence the inertia force of the vessel becomes very high, so that the shock-receiving portion and the securing portions of the marine fender are obliged to receive a strong berthing impact force during berthing and mooring of such large-sized vessel. Furthermore, it is actually very difficult to avoid the berthing of the vessel inclined at a certain angle with respect to the marine fender during the steering. In the latter case, excessive stress load is applied to a local area of the marine fender contacting with the vessel, so that the marine fender itself is deformed and damaged. And also, a large force is applied to the securing portion of the marine fender, so that the bonding of bolts to nuts becomes loose and consequently the fixed state of the marine fender to the quay wall becomes unstable. Moreover, when the marine fender is excessively compressed by the berthing impact force, an outer wall of the supporting portion of the marine fender may be damaged by contacting with the bolts and nuts in the securing portion.

In use, the marine fender is influenced by sea water, so that the bolts and nuts are apt to be corroded. This corrosion extends to a metal plate member embedded in the securing portion adjoining to the bolts and nuts and as a result, the adhesion of the metal plate member to rubber of the securing portion is decreased, so that a fatal damage is given to the marine fender.

In order to prevent the loosening of the bolts and nuts, there has hitherto been used a method of fixing a head portion of bolt to a metal rod attached to quay wall by welding. However, this welding method requires a great amount of skill in the welding operation and also there is a risk in the welding operation near oil-existing places because sparks fly during the welding. Furthermore, protrusions are formed on the welded part, so that this welding method is unfavorable if it is intended to prevent damaging on the outer wall of the supporting portion in the marine fender. In order to prevent the corrosion of bolts and nuts, there is attempted the use of stainless steel as a material for bolts and nuts. However, the stainless steel is expensive in cost and also there is no effectivity for preventing the corrosion of the metal plate member embedded in the securing portion. In order to prevent the damaging on the outer wall of the supporting portion of the marine fender, there is known a method of covering each head portion of the bolts and nuts with a rubber cap wherein the rubber cap is adhered to the bolt and nut with a usual adhesive. However, this adhesive does not serve to fill up a gap enough, so that it is necessary to widen the adhesive surface area by applying a pressure in order to provide a satisfactory adhesion. Furthermore, it is very difficult to hold the rubber cap covering the bolt and nut at the contact bonding state and as a result, the sealing by the rubber cap is incomplete. Therefore, the use of the rubber cap is not effective for preventing the loosening and corrosion of the bolt and nut.

In general, the loosening and corrosion of the metal fixing member as described above come into question to rubber offshore structures such as marine hose, sleeve hose, oil boom and the like besides the marine fender.

SUMMARY OF THE INVENTION

It is, therefore, an object of the present invention to prevent the loosening and corrosion of metal fixing members in connection parts of rubber offshore structures so as to securely fasten the structure to a corresponding portion of a connecting part by means of the metal fixing member.

It is another object of the present invention to prevent the damaging on the outer wall of the marine fender due to excessive compression.

That is, the present invention lies in a method of fixing connection parts of rubber offshore structures which comprises fastening the offshore structure to a corresponding portion of a connecting part by means of a metal fixing member and then covering an outer surface of the metal fixing member with a liquid rubber composition curable at room temperature.

According to the present invention, the loosening of the metal fixing member in the connection part can be prevented by a safe and simple application of the liquid rubber composition, so that the connection part of the rubber offshore structure such as marine fender, marine hose, sleeve hose, oil boom or the like can firmly be fixed.

According to the present invention, the metal fixing member is completely sealed with the liquid rubber composition, so that the corrosion of the metal fixing member and the decrease of adhesion between the rubber of the connection part and the embedded metal plate member accompanied therewith can effectively be prevented. Therefore, the present invention is particularly effective for fixing the marine fender to the quay wall.

Further, the present invention can prevent the damaging on the outer wall of the marine fender due to excessive compression.

BRIEF DESCRIPTION OF THE DRAWINGS

The invention will now be described in greater detail with reference to the accompanying drawings, wherein.

DESCRIPTION OF THE PREFERRED EMBODIMENTS

Figure 1:
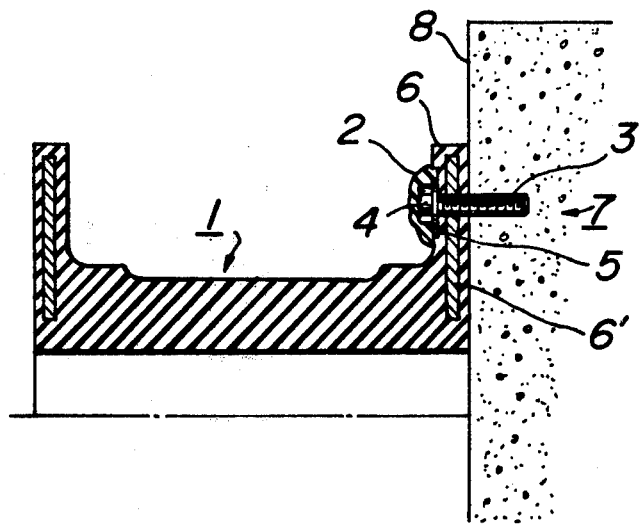
FIGS. 1 and 2 are partly sectional side elevations of an embodiment of the securing member of the marine fender fixed to quay wall by the method of the present invention, respectively.

According to the present invention, the rubber offshore structure include marine fenders, oil booms, marine hoses, sleeve hoses and the like and is mainly composed of a rubber such as natural rubber, polyisoprene rubber, polybutadiene rubber, polychloroprene rubber, styrene-butadiene copolymer rubber, acrylonitrile-butadiene copolymer rubber, isobutylene-isoprene copolymer rubber, chlorinated isobutylene-isoprene copolymer rubber, brominated isobutylene-isoprene copolymer rubber, ethylene-propylene copolymer rubber, ethylene-propylene-cyclopentadiene terpolymer, ethylene-propylene-5-ethylidene-2-norbornene terpolymer, ethylene-propylene-1,4-hexadiene terpolymer, polyalkenamer, polyepichlorohydrin rubber, polypropylene oxide rubber and the like.

The liquid rubber composition curable at room temperature to be used in the present invention is a blend of a liquid rubber having at its terminal a functional group selected from hydroxyl group, amino group, isocyanato group, mercapto group, epoxy group, halogen atom, aziridino group, carboxyl group and the like, a curing agent having a group reacting with the above functional group at room temperature and, if necessary, a curing catalyst. The liquid rubber has a molecular weight of 500-30,000, preferably 1,000-20,000 and a backbone structure constituted with 1,4-polybutadiene, 1,2-polybutadiene, styrene-butadiene copolymer, butadiene-acrylonitrile copolymer, chloroprene, various polyethers, various polyesters, polysulfide polymer or the like. According to the present invention, as the liquid rubber are preferably used a hydroxyl group-terminated-1,4-polybutadiene, a hydroxyl group-terminated-1,2-polybutadiene, an epoxy group-terminated-1,2-polybutadiene, a hydroxyl group-terminated butadiene-styrene copolymer, a hydroxyl or amino group-terminated butadiene-acrylonitrile copolymer, a hydroxyl or isocyanato group-terminated polyether, a hydroxyl or isocyanato group-terminated polyester, a mercapto group-terminated polysulfide polymer and the like.

The curing agent includes isocyanate compounds, epoxy compounds, amino compounds, hydroxyl compounds, lead oxide (PbO$_2$) and the like. As the isocyanate compound, mention may be made of ethylene diisocyanate, tolylene diisocyanate, 4,4'-diphenylmethane diisocyanate, naphthalene diisocyanate, triphenylmethane-4,4',4''-triisocyanate and the like. As the epoxy compound, mention may be made of reaction products of epichlorohydrin with polyhydric alcohols such as glycerol, propylene glycol, ethylene glycol, sorbitol, mannitol and the like; reaction products of epichlorohydrin with polyhydric phenols such as resorcinol, hydroquinone, pyrocatechol and the like; and epoxy compounds obtained by oxidation of unsaturated bonding part with peracetic acid or hydrogen peroxide such as diglycidylether, butylglycidylether, vinylcyclohexane diepoxide and the like. As the amino compound, mention may be made of 4,4'-methylene-bis(2-chloroaniline), methylenedianiline, naphthalene-1,5-diamine, phenylenediamine, tolylene-2,4-diamine, diphenylether-4,4'-diamine, hydrazine, ethylenediamine, piperazine and the like. As the hydroxyl compound, mention may be made of ethylene glycol, propylene glycol, butane-1,3-diol, glycerine, trimethylol propane and the like.

In the liquid rubber composition according to the present invention, the amount of the curing agent used is optionally determined depending upon the kinds of the liquid rubber and the curing agent and is usually 2 to 20 parts by weight per 100 parts by weight of the liquid rubber. Moreover, the liquid rubber may be compounded with various additives such as carbon black, silica, calcium carbonate, calcium sulfate, clay, metal oxides, inorganic short fibers, organic short fibers, asphalt, coal tar, vegetable oils, animal oils, mineral oil, synthetic plasticizer, antioxidant, coloring agents and the like in various mixing ratios in compliance with use purpose.

The liquid rubber composition according to the present invention is high in not only the adhesion to the metal and rubber but also the fluidity and the tackiness, so that it sufficiently bonds to the metal fixing member and its surrounding rubber without pressure and hence the adhesive surface area can be widened.

According to the present invention, it is preferable that in order to enhance the adhesion of the liquid rubber composition to the metal and rubber, the outer surface of the metal fixing member and its surrunding rubber portion are firstly cleaned up with a suitable organic solvent and then the rubber portion is subjected to a surface bonding treatment and thereafter they are covered with the liquid rubber composition. As the surface bonding treatment, there are a method of applying cyanoacrylate, a method of using a surface treating agent together with a rubber cement and the like. Particularly, the adoption of the latter method gives a good result according to the present invention.

The surface treating agent is optionally selected from halogen molecule, aqueous solution of halogen molecule, halogen generating source, halogenoid solution and the like, typical examples of which include chlorine, bormine, hypochlorous acid, hypobromous acid, N-monohaloalkyl urethane, N,N-dihaloalkyl urethane, N,N-dihaloaryl sulfonamide, iodine isocyanate, thiocyanogen, trichloroacetic acid iodide, alkyl hypohalite, alkylthionyl chloride, nitrosyl chloride, sulfur halide and the like. Among them, N,N-dihaloalkyl urethane, N,N-dihaloaryl sulfonamide and iodine isocyanate are preferable. The surface treating agent is used in an amount of 3 to 15% by weight as a solution in a suitable solvent.

As the rubber cement, there are properly ones capable of bonding vulcanized rubber to liquid rubber. For instance, when the hydroxyl group-terminated polybutadiene is used as the liquid rubber, a rubber composition obtained by mixing a main constituent composed of butadiene-acrylonitrile copolymer rubber (hereinafter abbreviated as NBR), a metal oxide such as zinc oxide or the like and a resorcin-disulfide resin with a curing agent such as isocyanate and the like is effectively used as the rubber cement because of excellent tackiness and adhesion. In this case, the main constituent is prepared by compounding 100 parts by weight of NBR with 1-20 parts by weight of the metal oxide and 1-20 parts by weight of the resorcin-disulfide resin and used in an amount of 5-30% by weight as a solution in a suitable solvent. Further, the amount of the curing agent used is not critical, but it is used in an amount of 2-30 parts by weight based on 100 parts by weight of the solution of the main constituent. Moreover, when the isocyanato group-terminated polyether is used as the liquid rubber, the usual urethane prepolymer containing the curing agent is used as the rubber cement.

In another embodiment of the present invention, when the outer surface of the metal fixing member is covered with the liquid rubber composition, a cap composed of a resilient material is used. In this case, the appropriate amount of the liquid rubber composition is filled in the cap and thereafter the cap is put on the outer surface of the metal fixing member. Thus, the outer surface of the metal fixing member is completely sealed with the cap through the liquid rubber composition and also the amount of the liquid rubber composition used is considerably saved as compared with the case of using no cap.

Figure 2:
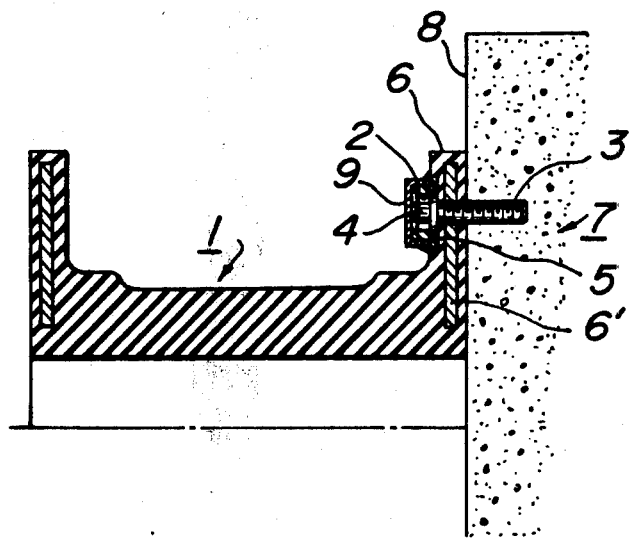

FIGS. 1 and 2 show the states of fixing a marine fender as the rubber offshore structure to a quay wall by the method of the present invention, respectively. In FIG. 1, numeral 6 represents a securing portion of a marine fender 1 composed mainly of a rubber, which is reinforced with an embedded metal plate member 6'. The securing portion 6 of the marine fender 1 is fixed to a supporting surface 8 of a quay wall 7 by means of a metal fixing member 3 such as bolts and nuts. The head portion 4 of the metal fixing member 3 is covered with a sealing material 2 composed of a liquid rubber composition. Moreover, numeral 5 represents a rubber portion to be covered with the sealing material 2 around the head portion 4 of the metal fixing member 3.

In the practice of the present invention, the marine fender 1 is fastened to the supporting surface 8 of the quay wall 7 by means of the metal fixing member 3 and then a liquid rubber composition curable at room temperature is applied as the sealing material 2 to the head portion of the metal fixing member 3 so as to be completely covered. After about one day, the sealing material 2 completely cures and as a result, the securing portion 6 is firmly fixed.

In the preferred embodiment of the present invention, the head portion 4 of the metal fixing member 3 and the rubber portion 5 are first cleaned up with a suitable organic solvent such as acetone to remove contaminations such as oil, dust and the like. Then, the rubber portion 5 is subjected to a surface bonding treatment and thereafter the liquid rubber composition is applied as the sealing material 2.

FIG. 2 is the case of using the sealing material 2 together with a cap 9 composed of a resilient material for covering the head portion 4 of the metal fixing member 3 after the securing portion 6 of the marine fender 1 is fastened to the quay wall 7. In the practice, it is preferable that the inside and outer periphery of the cap is cleaned up with an organic solvent and then subjected to the same surface bonding treatment as described above. In the thus treated cap 9 is filled the sealing material 2 composed of the liquid rubber composition to a depth of about seven tenth and then put on the head portion 4 of the metal fixing member 3 and bonded thereto under pressure, whereby the metal fixing member 3 is completely sealed with the sealing material 2 and the cap 9.

As shown in FIG. 2, the use of the cap is easy in operation in view of the prevention of freely flowing the liquid rubber and also economical because the amount of the liquid rubber composition used can be decreased considerably. Furthermore, the use of the cap is more effective for preventing the damaging on the outer wall of the supporting portion of the marine fender and is favorable in view of the durability of the marine fender and the appearance.

Figure 3:
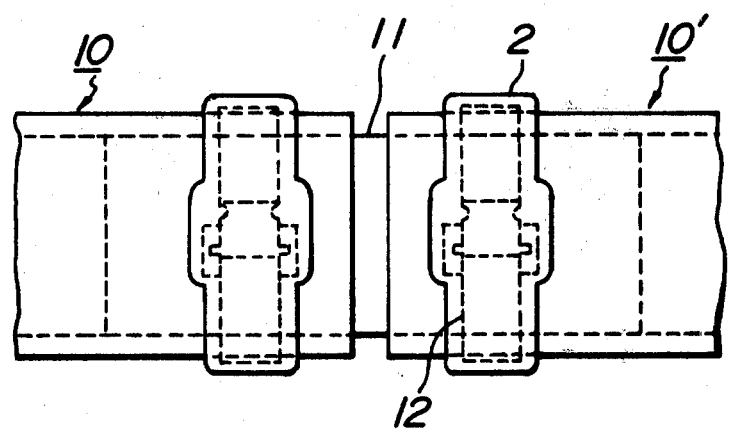
FIG. 3 is a partly elevational view showing the connection between two hoses fixed by the method of the present invention.

FIG. 3 shows the state of connecting two hoses as the rubber offshore structure by the method of the present invention. The connection between the hose bodies 10 and 10' is carried out by inserting a hard plastic inner tube 11 into each end of the hose bodies 10, 10' and clamping each of the hose bodies with a stainless steel band 12 from exterior. The outer surface of the stainless steel band and its surrounding rubber portion are cleaned up with a suitable organic solvent to remove oil, dust and the like and then the rubber portion is subjected to a surface bonding treatment by applying a surface treating agent and a rubber cement. Thereafter, the outer surface of the stainless steel band and the surrounding rubber portion are completely covered with the sealing material 2. After about one day, the sealing material 2 completely cures to securely fix the stainless steel band.

The following examples are given in illustration of this invention and are not intended as limitations thereof.

EXAMPLE 1

A marine fender (cell-type, made by Bridgestone Tire Co., Ltd.) was fastened to quay wall by means of bolts and nuts. The head portion of the bolt and its surrounding rubber portion as well as the inside and outer periphery of a previously shaped rubber cap (outer diameter: 180 mm, thickness: 15 mm, depth: 60 mm) were cleaned up with an acetone impregnated cloth. Then, the cleaned portions were subjected to a surface treatment by applying a 5% solution of N,N-dichloro-p-toluene sulfonamide in acetone three times. After the surface treatment, the treated portion is left to stand for 1-2 minutes and thereafter cleaned up with the acetone impregnated cloth. Then, the thus treated portion was covered with a rubber cement having a composition shown in the following Table 1.

Table 1

| Composition of rubber cement | | Parts by weight |
|---|---|---|
| Main constituent: | Nitrile rubber (Chemigum N-206) *1 | 100 |
| | Carbon black | 15 |
| | Resorcin-disulfide resin | 7.5 |
| | Zinc oxide | 5 |
| | Dichloromethane | 723 |
| Curing agent: | Desmodur R *2 | 425 |
| Ratio of main constituent to curing agent = 2 : 1 | | |

*1: made by Goodyear Tire and Rubber Co.
*2: 20% solution of triphenylmethane-4,4'4"-triisocyanate in dichloromethane, made by Bayer.

Next, a sealing material composed of a liquid rubber composition having a composition shown in the following Table 2 was filled in the rubber cap to a depth of about seven tenth and put on and contact bonded to the head portion of the bolt. After about one day, the curing of the sealing material was completed and the rubber cap was firmly adhered to the head portion of the bolt with the sealing material. The adhesion of the sealing material to rubber and metal was satisfactory to be about 10 kg/25 mm (rubber breakage) as measured by a peeling test.

Table 2

| Composition of sealing material | | Parts by weight |
|---|---|---|
| Main constituent: | Liquid polybutadiene *3 | 100 |
| | Asphalt | 25 |
| | Calcium carbonate | 130 |
| Curing agent: | Liquid polybutadiene *3 | 100 |
| | Tolylene diisocyanate | 22 |
| Ratio of main constituent to curing agent = 100 : 8 | | |

*3: Hydroxyl group-terminated-1,4-polybutadiene, made by Idemitsu Petrochemical Co., Ltd.

EXAMPLE 2

The same marine fender as used in Example 1 was fastened to the quay wall by means of bolts and nuts. The head portion of the bolt and its surrounding rubber portion as well as the inside and outer periphery of the previously shaped rubber cap were cleaned up with an acetone impregnated cloth. Then, these cleaned portions were dried for 2-3 minutes, coated with cyanoacrylate and dried for 2–3 minutes and thereafter the rubber cap was put on the head portion of the bolt through the sealing material shown in Table 2 in the same manner as described in Example 1.

The adhesion of the sealing material to rubber and metal was satisfactory to be more than 10 kg/25 mm.

EXAMPLE 3

The same marine fender as used in Example 1 was fastened to the quay wall by means of bolts and nuts. The head portion of the bolt and its surrounding rubber portion as well as the inside and outer periphery of the previously shaped rubber cap were cleaned up with an acetone impregnated cloth. Then, these cleaned portions were subjected to a surface treatment by applying a 5% solution of N,N-dichloro-p-toluene sulfonamide in acetone three times and thereafter left to stand for about 15 minutes and again cleaned up with the acetone impregnated cloth. Next, the thus treated portions were coated with a solution of urethane in acetone having a composition shown in the following Table 3 as a rubber cement.

Table 3

| Urethane-acetone solution | |
|---|---|
| Coronate 4046 *4 | 10 g |
| 4,4'-methylene-bis(2-chloroaniline) | 0.54 g |
| Acetone | 10 g |

*4: Isocyanato group-terminated polyester, made by Japan Polyurethane Co. Ltd.

After almost of acetone was evaporated, the rubber cap was put on the head portion of the bolt through a sealing material having a composition shown in the following Table 4 in the same manner as described in Example 1.

Table 4

| Sealing material | |
|---|---|
| | Parts by weight |
| Coronate 4046 | 100 |
| 4,4'-methylene-bis(2-chloroaniline) | 5.35 |

The adhesions of the sealing material to rubber and metal were 30 kg/25 mm and 20 kg/25 mm, respectively.

EXAMPLE 4

Air hoses mounted on sink-float type oil booms were connected to each other as follows. That is, a hard plastic inner tube was inserted in each end of the hoses to be connected and then the hose and the inner tube were clamped with a stainless steel band from exterior. The stainless steel band and its surrounding rubber portion were cleaned up with an acetone impregnated cloth and thereafter a 5% solution of N,N-dichloro-p-toluene sulfonamide in acetone was applied to the rubber portion three times. One to three minutes after the application, the thus treated portion was cleaned up with the acetone impregnated cloth. Then, the rubber cement having the composition shown in Table 1 was applied to the rubber portion and the stainless steel band and further the liquid rubber composition shown in Table 2 was applied thereto. After about one day, the liquid rubber composition was completely cured to firmly fix the connecting parts of the hoses.

The thus treated hoses were immersed in sea water at a depth of 1.5 m for 15 months, whereby the adhesive state and corrosion state of the connecting part were examined. The thus obtained results are shown in the following Table 5. For comparison, there are also shown the cases of using Neocoat and Zinc-rich paint instead of the liquid rubber composition wherein the treatment with the N,N-dichloro-p-toluene sulfonamide solution and the application of the rubber cement were not carried out.

Table 5

| | Liquid rubber composition | Neocoat | Zinc-rich paint | No application |
|---|---|---|---|---|
| Adhesion state | Completely adhered to the rubber portion of the hose, but peeled at the stainless steel band only by 10%. | Mostly peeled | Peeled by 70% | — |
| Corrosion state | Peeled portion was corroded. | Peeled portion was corroded. | Peeled portion was corroded. | Inner surface of the band and its buckle portion were corroded. |

What is claimed is:

1. A method of fixing connection parts of rubber offshore structures, comprising fastening said connection part of the rubber offshore structure to a corresponding portion of a connecting part by means of a metal fixing member and then covering outer surfaces of said metal fixing member and rubber areas surrounding said metal fixing member with a liquid rubber composition curable at room temperature.

2. A method as claimed in claim 1, wherein said liquid rubber composition curable at room temperature is a blend of a liquid rubber having at its terminal a functional group selected from hydroxyl group, amino group, isocyanato group, mercapto group, epoxy group, halogen atom, aziridino group and carboxyl group, and a curing agent having a group reacting with said functional group at room temperature.

3. A method as claimed in claim 2, wherein said liquid rubber is selected from the group consisting of a hydroxyl group-terminated-1,4-polybutadiene, a hydroxyl group-terminated-1,2-polybutadiene, an epoxy group-terminated-1,2-polybutadiene, a hydroxyl group-terminated butadiene-styrene copolymer, a hydroxyl or amino group-terminated butadiene-acrylonitrile copolymer, a hydroxyl or isocyanato group-terminated polyether, a hydroxyl or isocyanato group-terminated polyester and a mercapto group-terminated polysulfide polymer.

4. A method as claimed in claim 2, wherein said liquid rubber is a hydroxyl group-terminated-1,4-polybutadiene, a hydroxyl group-terminated butadiene-styrene copolymer, a hydroxyl group-terminated butadiene-acrylonitrile copolymer or an isocyanato group-terminated polyether.

5. A method as claimed in claim 2, wherein said curing agent is selected from the group consisting of isocyanate compounds, epoxy compounds, amino compounds, hydroxyl compounds and lead oxide.

6. A method as claimed in claim 1, wherein a cap composed of a resilient material is used when covering the outer surface of said metal fixing member with said liquid rubber composition.

7. A method as claimed in claim 1, wherein said rubber offshore structure is a marine fender.

8. A method as claimed in claim 1, wherein said corresponding portion of the connecting part is a supporting surface of a quay wall.

9. A method as claimed in claim 1, wherein said metal fixing member is bolts and nuts.

10. A method as claimed in claim 1, wherein as each of said rubber offshore structure and as said connecting part there is used a rubber marine hose, an inner tube is inserted into each end of the connection parts of the marine hoses to be connected with each other, each of said connection parts clamped with a metal fixing member and then the outer surfaces of said metal fixing members and their surrounding rubber portions are covered with the liquid rubber composition curable at room temperature.

11. A method as claimed in claim 10, wherein said metal fixing member is a stainless steel band.

12. A method of fixing connection parts of rubber offshore structures, comprising fastening said connection part of the rubber offshore structure to a corresponding portion of a connecting part by means of a metal fixing member, subjecting the rubber areas surrounding said metal fixing member to a surface bonding treatment and then covering outer surfaces of said metal fixing member and rubber areas surrounding said metal fixing member with a liquid rubber composition curable at room temperature.

13. A method as claimed in claim 12, wherein said surface bonding treatment is carried out by applying cyano-acrylate to said rubber surface.

14. A method as claimed in claim 12, wherein said surface bonding treatment is carried out by applying a surface treating agent and further a rubber cement to said rubber surface.

15. A method as claimed in claim 14, wherein said surface treating agent is selected from the group consisting of halogen molecule, aqueous solution of halogen molecule, halogen generating source and halogenoid solution.

16. A method as claimed in claim 14, wherein said surface treating agent is a halogenoid solution.

17. A method as claimed in claim 16, wherein said halogenoid is N,N-dichloro-p-toluene sulfonamide.

18. A method as claimed in claim 14, wherein said rubber cement is a blend of a main constituent composed of butadiene-acrylonitrile copolymer, a metal oxide and resorcin-disulfide resin, and a curing agent.

19. A method as claimed in claim 14, wherein said rubber cement is an urethane prepolymer solution containing a curing agent.

* * * * *